(12) United States Patent
Lan et al.

(10) Patent No.: US 6,665,253 B2
(45) Date of Patent: Dec. 16, 2003

(54) OPTICAL DISK CONTROL MECHANISM

(75) Inventors: Yong-Song Lan, Kang-Shan Chen (TW); Chi-Shen Chang, Hu-Kou Hsian (TW)

(73) Assignee: Industrial Technology Research Institute, Hsinchu (TW)

( * ) Notice: Subject to any disclaimer, the term of this patent is extended or adjusted under 35 U.S.C. 154(b) by 333 days.

(21) Appl. No.: 09/930,748

(22) Filed: Aug. 14, 2001

(65) Prior Publication Data
US 2002/0176347 A1 Nov. 28, 2002

(30) Foreign Application Priority Data
May 23, 2001 (TW) ........................................ 90112341 A

(51) Int. Cl.[7] .............................................. G11B 33/02
(52) U.S. Cl. ..................................................... 369/75.2
(58) Field of Search ................................ 369/75.2, 75.1

(56) References Cited

U.S. PATENT DOCUMENTS 3,914,526 A * 10/1975 Markarian et al. .......... 373/105
4,851,634 A * 7/1989 Vakhidov et al. ......... 219/69.15

* cited by examiner

Primary Examiner—George J. Letscher
(74) Attorney, Agent, or Firm—J.C. Patents

(57) ABSTRACT

An optical disk control mechanism comprising an electric motor, a transmission component, a limiting switch and a sliding plate. The transmission component rotates when driven by the electric motor. The transmission component includes a first timing element and a second timing element. The limiting switch has a first electrode head and a second electrode head. The first timing element makes contact with the first electrode head so that the first electrode head and the second electrode head can connect electrically when the transmission component rotates. The sliding plate has an edge. The second timing element makes contact with the edge of the sliding plate and pushes the sliding plate along as the transmission component rotates.

14 Claims, 12 Drawing Sheets

OPTICAL DISK CONTROL MECHANISM

CROSS-REFERENCE TO RELATED APPLICATION

This application claims the priority benefit of Taiwan application serial no. 90112341, filed May 23, 2001.

BACKGROUND OF THE INVENTION

1. Field of Invention

The present invention relates to an optical disk control mechanism. More particularly, the present invention relates to an easy-to-assemble and space-saving optical disk control mechanism.

2. Description of Related Art

In this information explosion world, electronic products have become an indispensable part of our daily life. Following the rapid progress in electronic technologies, increasingly personalized and functionally specialized electronic products are out on the market. Nowadays, most electronic products are aiming towards a lighter, slimmer and smaller design. This trend also applied towards an optical disk. In fact, optical disk has shrunk to such a small size that the optical disk can easily fit inside an all-in-one notebook computer.

FIG. 1 is a schematic top view of a conventional optical disk structure. The optical disk structure 110 includes an electric motor 120, a set of transmission gear 130, a latching lever 140 and a spring 150. A latching peg 162 is fastened onto the optical disk body 160. Before electricity is supplied to the electric motor 120, the latching lever 140 is centered upon an axle pin 190. Through tension provided by the spring 150, the latching level 140 is able to rotate in a clockwise direction so that the first end section 142 of the latching level 140 latches onto the latching peg 162. When a user decides to move the optical disk body 160 out from the housing, the user touches an optical disk button (not shown). The button switches on a power source so that power is channeled to the electric motor 120. The electric motor 120 drives a first transmission wheel 132 and a second transmission wheel 134. The transmission peg 170 pushes the second end section 144 of the latching lever 140 so that the latching lever 140 rotates in an anti-clockwise direction. Ultimately, the first end section 142 leaves the latching peg 162. Utilizing an optical disk ejection mechanism (not shown), the optical disk body 160 slides in a direction A2 so that the optical disk body 160 gradually moves away from the optical disk housing 180.

In the aforementioned optical disk mechanism, space must be set aside to house the entire control mechanism 110. With this type of design, the longitudinal length d1 of the optical disk housing 180 must be greater than the longitudinal length d2 of the optical disk body 160. Hence, overall volume of the entire optical disk is increased, contrary to the goal of miniaturization. In addition, the components of the aforementioned control mechanism 110, including the electric motor 120, the set of transmission gears 130, the latching lever 140 and the spring 150, need to be assembled inside the optical disk housing 180 one by one. Hence, the assembling method is not only complicated but also quite inefficient as well.

SUMMARY OF THE INVENTION

Accordingly, one object of the present invention is to provide an optical disk control mechanism that takes up a smaller volume.

A second object of this invention is to provide an optical disk control mechanism having a modular design capable of speeding up its assembling rate.

To achieve these and other advantages and in accordance with the purpose of the invention, as embodied and broadly described herein, the invention provides an optical disk control mechanism. The optical disk control mechanism includes a base frame, an electric motor, a worm screw, a circular rod, a transmission component, a limiting switch, a sliding plate and a spring. The electric motor has a transmission axle capable of rotating in a defined direction. The electric motor is fastened onto the base frame. The worm screw is fastened to the transmission axle of the electric motor such that the worm screw rotates when driven by the electric motor. The circular rod is fastened to the base frame. The transmission component has a worm gear, a first eccentric wheel and a second eccentric wheel. The first and the second eccentric wheel are fixed on each side of the worm gear. The transmission component further has a hole that corresponds to the center of the worm gear. Through the hole, the transmission component slides into the circular rod. The transmission component is able to rotate by using the circular rod as an axle such that the worm screw and the worm gear mesh with each other. The transmission component rotates when driven by the worm screw. The straight line from the shape center of the first eccentric wheel to the shape center of the worm gear and the straight line from the shape center of the second eccentric wheel to the shape center of the worm gear form a phase angle. The limiting switch is also fastened to the base frame. The limiting switch has a first electrode head and a second electrode head. Rotation of the transmission component drives the first eccentric wheel and pushes the first electric head so that the first electric head is able to contact the second electric head. The sliding plate is capable of sliding on the base frame. The sliding plate has a terminal edge that contacts the second eccentric wheel so that the sliding plate slides along the base frame as the transmission component rotates. One end of the spring is fastened to the base frame while the other end of the spring is fastened to the sliding plate.

According to one preferred embodiment of this invention, the worm gear, the first eccentric wheel, the second eccentric wheel of the transmission component are manufactured in one piece. Furthermore, the phase angle is 90°.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
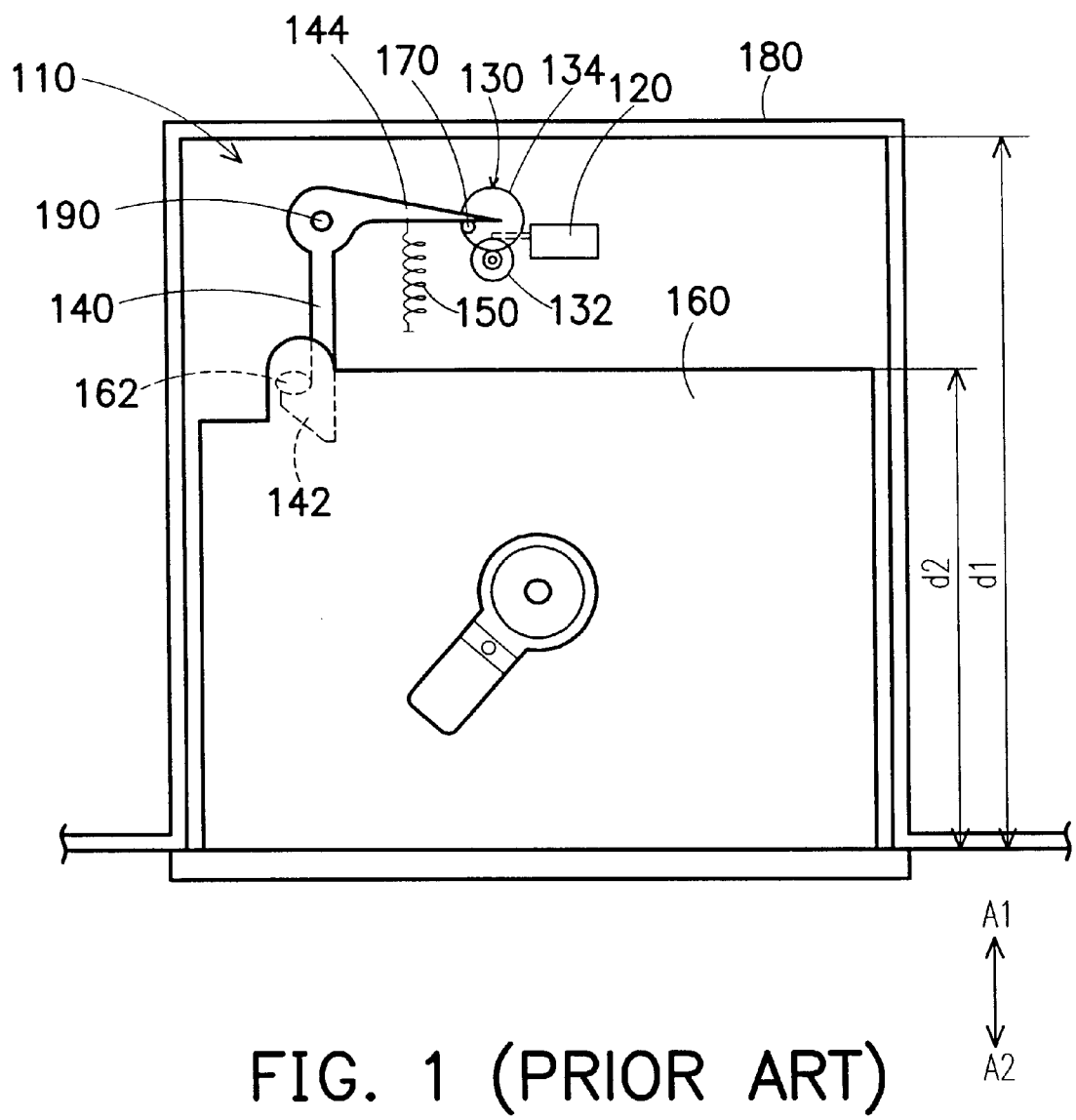
FIG. 1 is a schematic top view of a conventional optical disk structure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
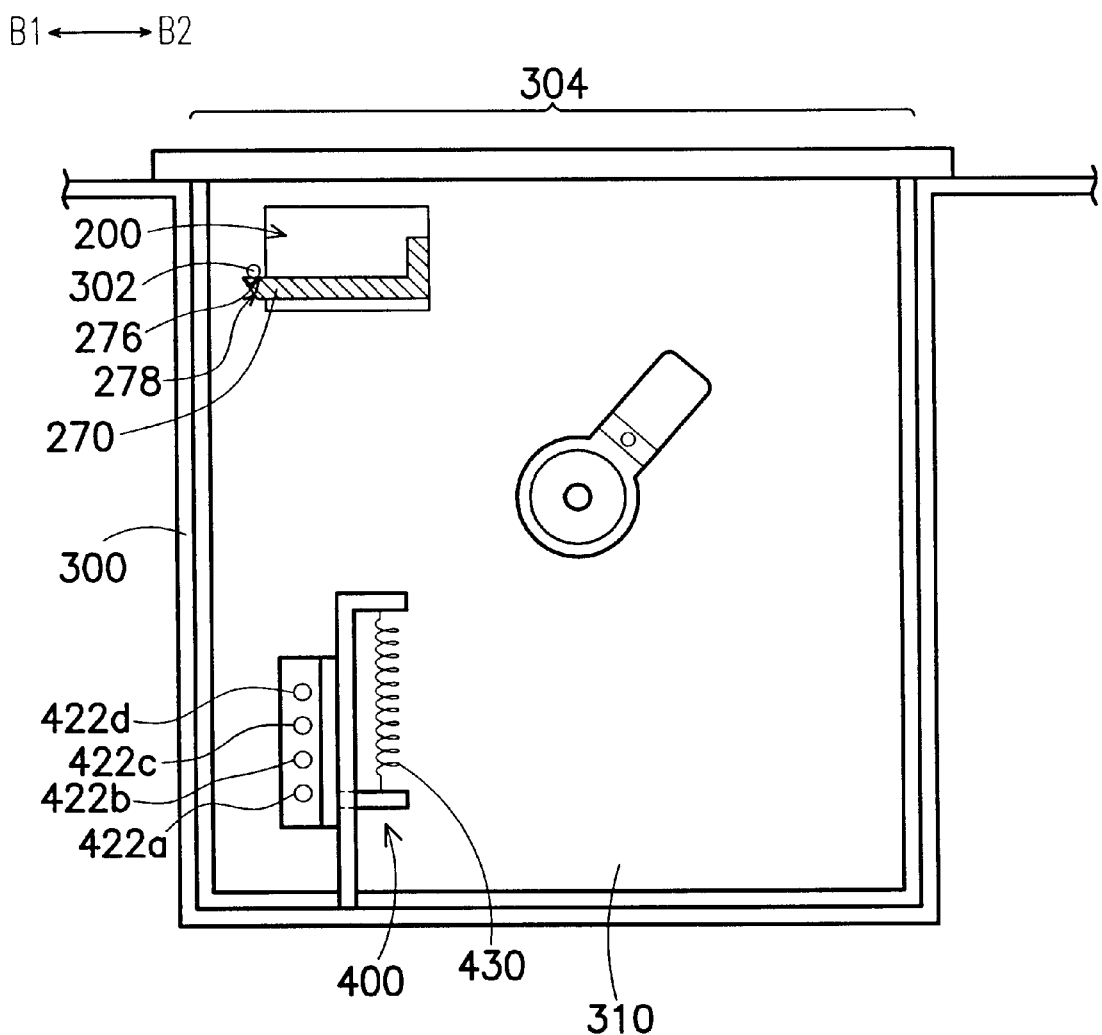
FIG. 2 is a schematic diagram showing an optical disk control mechanism, an optical disk ejection system and an optical disk body relative to the backside of the optical disk machine according to one preferred embodiment of this invention.

FIG. 2 is a schematic diagram showing an optical disk control mechanism, an optical disk ejection system and an optical disk body relative to the backside of the optical disk machine according to one preferred embodiment of this invention. As shown in FIG. 2, an optical disk control mechanism 200 and an optical ejection system 400 are fastened onto an optical disk body 310. In addition, there is an optical disk housing 300 having a latching button 302 and an opening 304. The optical disk body 310 slides into the optical disk housing 300 via the opening 304. The latching button terminal edge 276 of a sliding plate 270 on the optical disk control mechanism 200 clicks onto the latching button 302 of the optical disk housing 300. Hence, the optical disk body 310 is fixed inside the optical disk housing 300. To open the optical disk body 310, the sliding plate 270 must slide in the direction B2 so that the latching button 302 is unimpeded when the optical disk body 310 is ejected. In the meantime, the optical disk body 310 is able to move away from the optical disk housing 300 through tension provided by a spring 430 attached to the optical disk ejection system 400.

Figure 3:
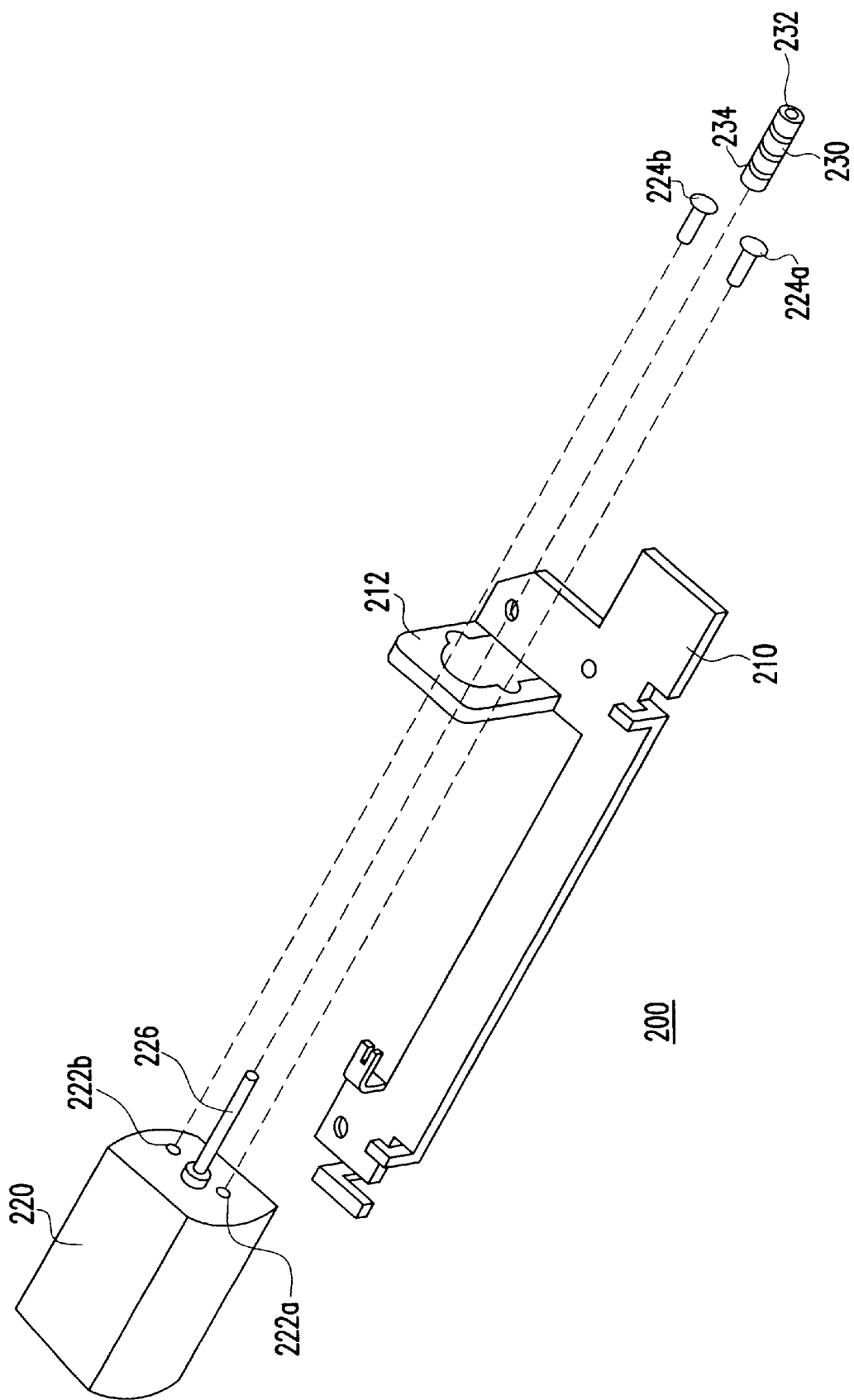
FIGS. 3 to 6 are a series of diagrams showing the components of various assemblies for fabricating the optical disk control mechanism according to this invention.

FIGS. 3 to 6 are a series of diagrams showing the components of various assemblies for fabricating the optical disk control mechanism according to this invention. As shown in FIG. 3, an optical disk control mechanism 200 includes a base frame 210, an electric motor 220 and a worm screw 230. The electric motor 220 has a pair of threaded holes 222a and 222b so that a pair of bolts 224a and 224b can pass through and lock the electric motor 220 onto the supporting plate 212 of the base frame 210. The electric motor 220 has an axle 226 capable of rotating when driven. The worm screw 230 has a center hole 232 by which the worm screw 230 is mounted on the axle 226 of the electric motor 220. Rotation of the axle 226 also rotates the worm screw 230. The worm screw has a spiral groove 234 in its outer surface.

Figure 4:
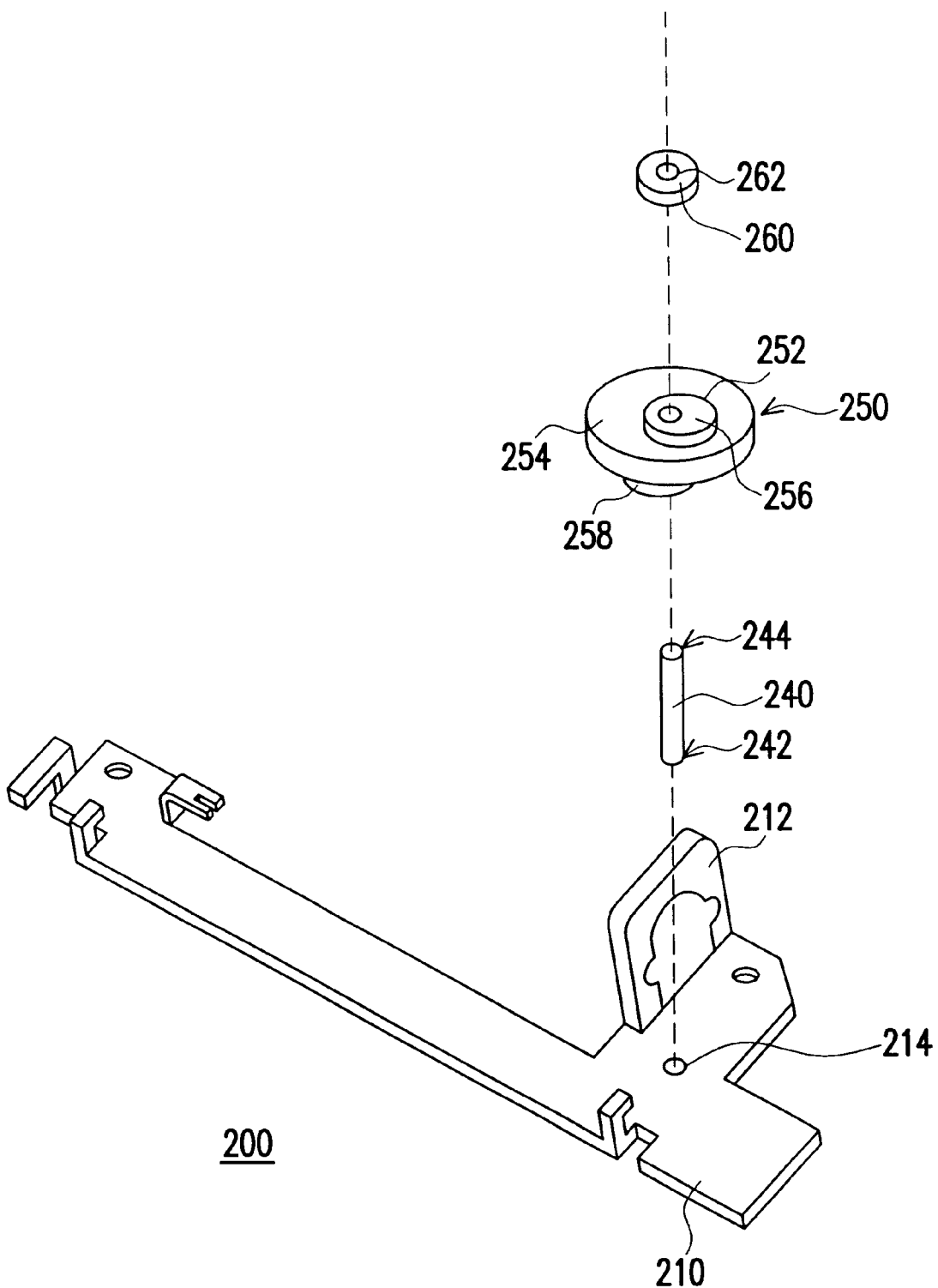
Figure 4A:
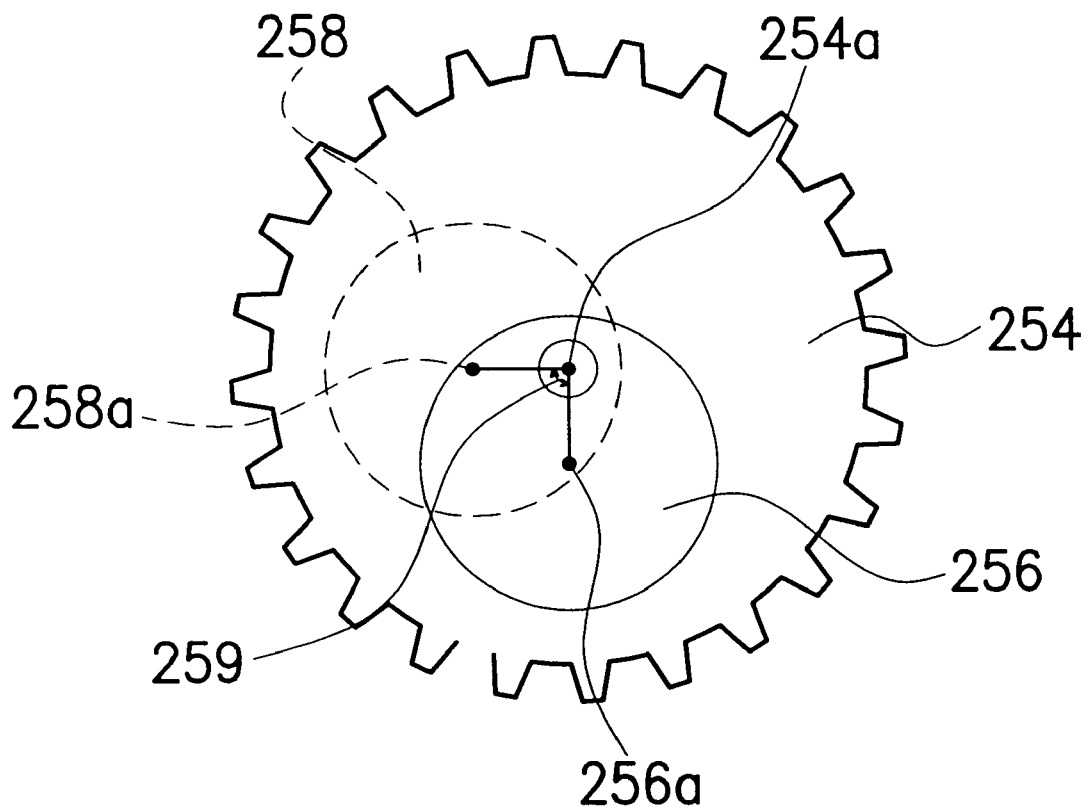
FIG. 4A is a magnified top view of the transmission component according to this invention.

As shown in FIG. 4, the optical disk control mechanism 200 further includes a circular rod 240, a transmission component 250 and a pad plate 260. One end of the circular rod 240 is inserted into a hole 214 in the base frame 210. The transmission component 250 has a hole 252. The transmission component 250 can slide into the circuit rod 240 through the hole 252. The center of the circular rod 240 serves as an axis for the rotation of the transmission component 250. The pad plate 260 has a hole 262. Through the hole 262, the pad plate 260 is fixed in position by sliding slides into the upper end 244 of the circuit rod 240 so that the transmission component 250 is prevented from disengaging from the circular rod 240. The transmission component 250 has a transmission wheel and a pair of timing cams. In this embodiment, the transmission wheel is a worm gear 254 and the pair of timing cams includes a first eccentric wheel 256 and a second eccentric wheel 258. The first eccentric wheel 256 and the second eccentric wheel 258 are on the respective sides of the worm gear 254. The first eccentric wheel 256, the second eccentric wheel 258 and the worm gear 254 of the transmission component 250 are manufactured as an integrative unit. FIG. 4A is a magnified top view of the transmission component according to this invention. When the shape center 256a of the first eccentric wheel 256, the shape center 258a of the second eccentric wheel 258 and the shape center 254a of the worm gear 254 are projected onto a plane, the straight line from the shape center 256a of the first eccentric wheel 256 to the shape center 254a of the gear 254 and the straight line from the shape center 258a of the second eccentric wheel 258 to the shape center 254a of the worm gear 254 form a phase angle 259. In this embodiment, the phase angle is set at 90°. However, the phase angle 259 needs not be limited to 90°. The worm gear 254 of the transmission component 250 meshes with the spiraling structure 234 (shown in FIG. 3) on the outer surface of the worm screw 230, hence they are linked in transmission.

Figure 5:
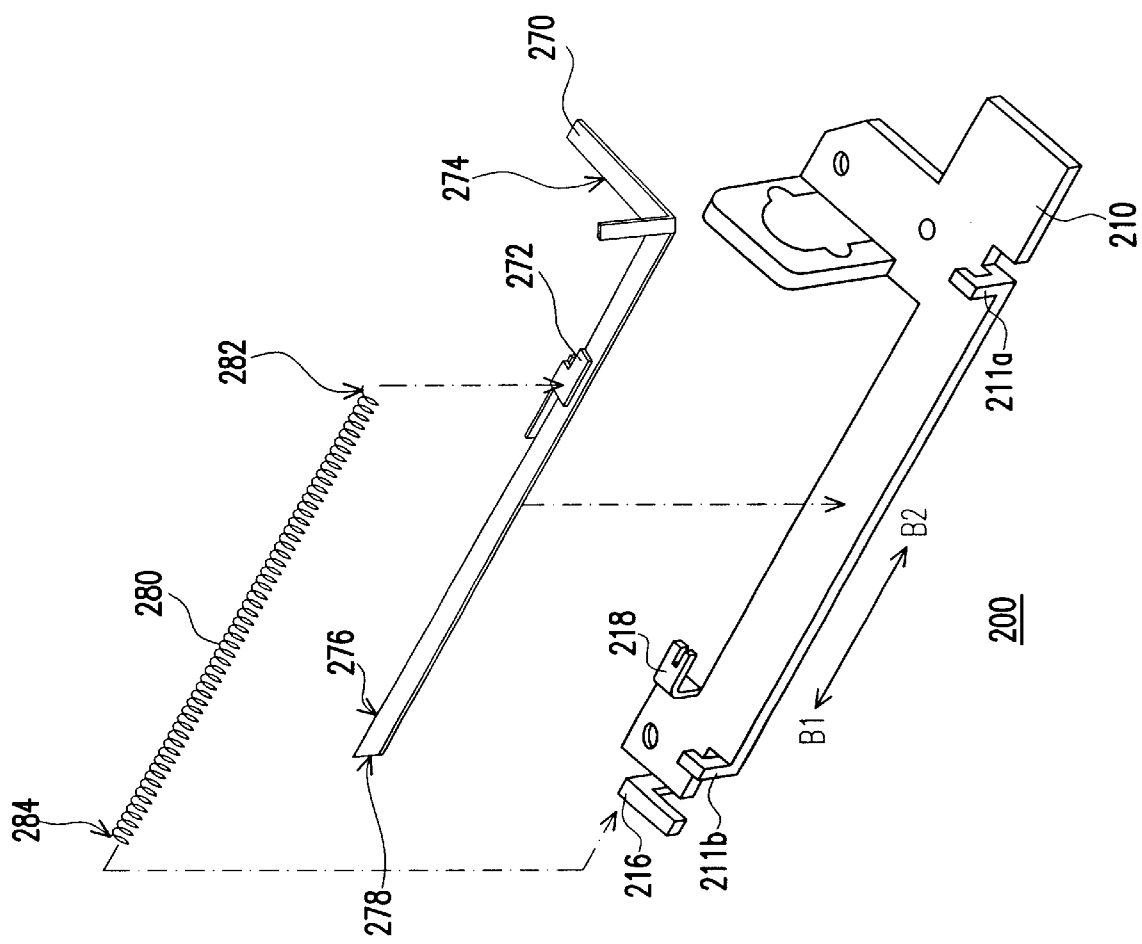

As show in FIG. 5, the optical disk control mechanism further includes a sliding plate 270 and a spring 280. The base frame 210 further includes a pair of protruding blocks 211a and 211b, a spring catcher 216 and a limiting switch support frame 218. The sliding plate 270 is placed between the two protruding blocks 211a, 211b, the spring catcher 216 and the limiting switch support frame 218. The sliding plate 270 is permitted to slide along longitudinally in a forward or a backward direction B1 and B2. The spring 280 has a first end 282 and a second end 284. The sliding plate 270 has a spring catcher 272. The first end 282 of the spring 280 is fixed onto the spring catcher 272 of the sliding plate 270. The second end 284 of the spring 280 is fixed to the spring catcher 216 of the base frame 210. With such loading of the spring 280, the sliding plate 270 is able to slide along under traction. The sliding plate 270 further has an eccentric wheel edge 274, a latching button edge 276 and a slanted edge 278. The eccentric wheel edge 274 can make contact with the second eccentric wheel 258 (shown in FIG. 4) of the transmission component 250. The latching button edge 276 can make contact with the latch button 302 (shown in FIG. 2) of the optical disk housing 300.

Figure 6:
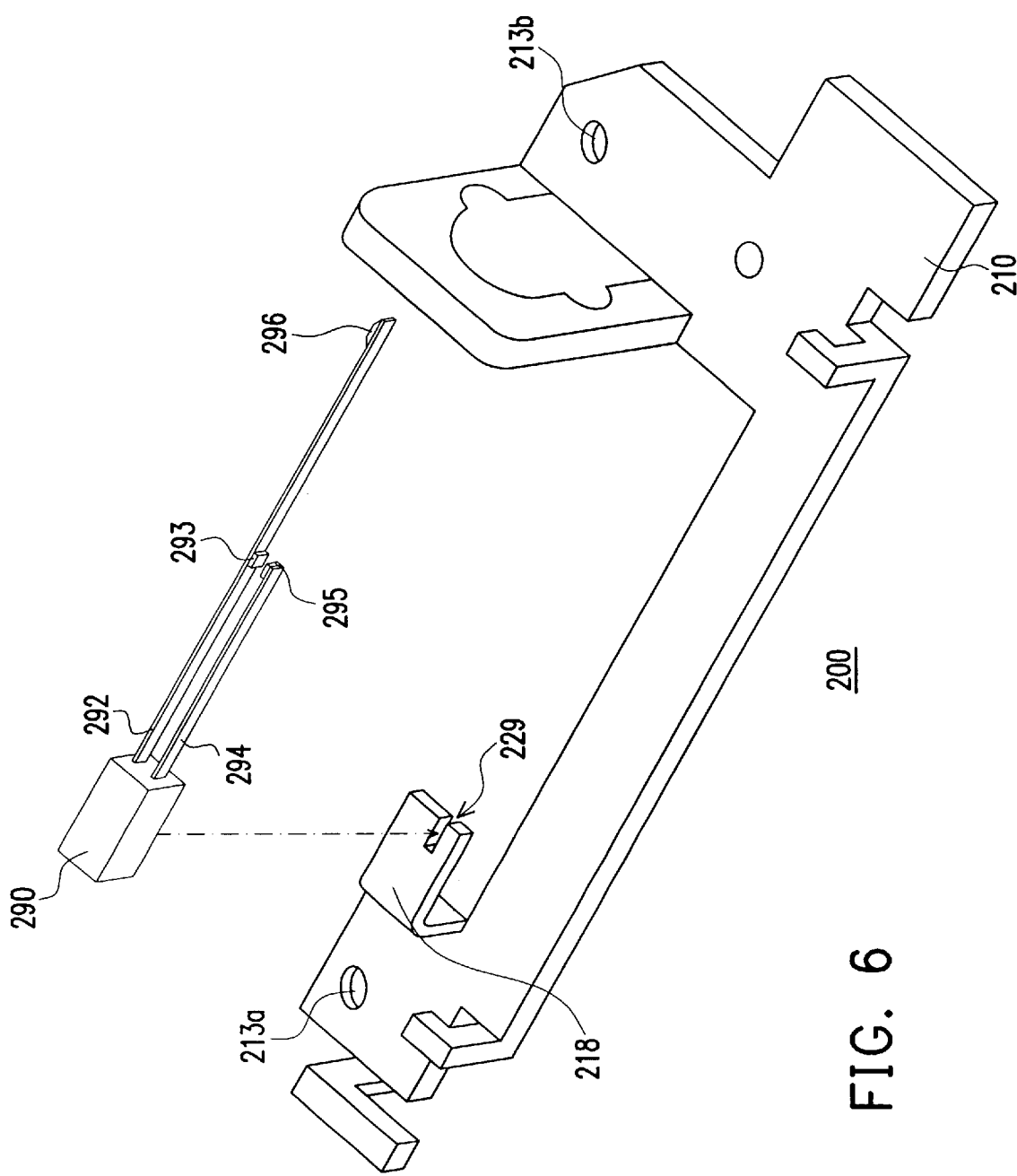

As shown in FIG. 6, the optical disk control mechanism 200 further includes a limiting switch 290. The bottom part of the limiting switch 290 has a pair of fastening blocks (not shown) for meshing with a slot 229 in the limiting switch support frame 218 of the base frame 210. The limiting switch 290 is accurately positioned on the limiting switch support frame 218 and glued thereto. The limiting switch 290 has a first electrode head 292 and a second electrode head 294. The first electrode head 292 has a first contact point 293 around the middle section and the second electrode head 294 has a second contact point 295 around the upper section. The upper section of the first electrode head 292 has a liner pad 296. Furthermore, the limiting switch 290 is electrically connected to the electric motor 220 for controlling the motor 220. The liner pad 296 of the first electrode head 292 can make contact with the first eccentric wheel 256 (shown in FIG. 4) of the transmission component 250.

As shown in FIG. 6, the base frame 210 has a pair of holes 213*a* and 213*b*. The optical disk control mechanism 200 is fastened to the optical disk body (not shown) by passing a pair of screws (not shown) through the holes 213*a* and 213*b* before tightening up.

Figure 7:
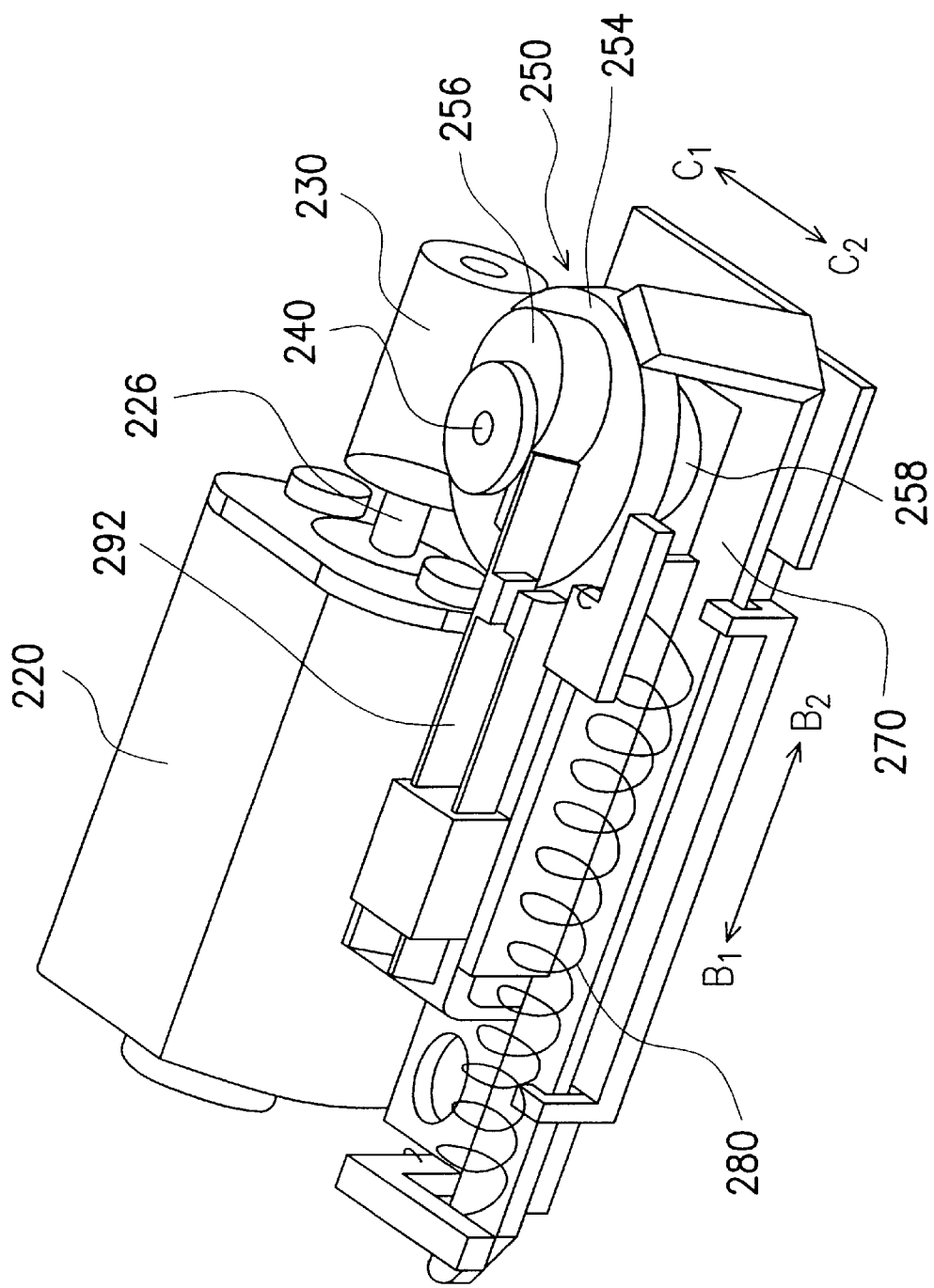
FIG. 7 is a perspective view of fully assembled optical disk control mechanism according to one preferred embodiment of this invention.

FIG. 7 is a perspective view of fully assembled optical disk control mechanism according to one preferred embodiment of this invention. As soon as the electric motor 220 is powered up, its axle 226 will rotate. The worm gear 230 rotates synchronously with the electric motor 220, driving the worm gear 254 on the transmission component 250. Hence, the entire transmission component 250 rotates with the circular rod 240 serving as a pivot. As the transmission component 250 rotates, the first eccentric wheel 256 drives the first electrode head 292 in a C1 to C2 direction and the second eccentric wheel 258 drives the sliding plate 270 in a B1 to B2 direction.

Figure 8:
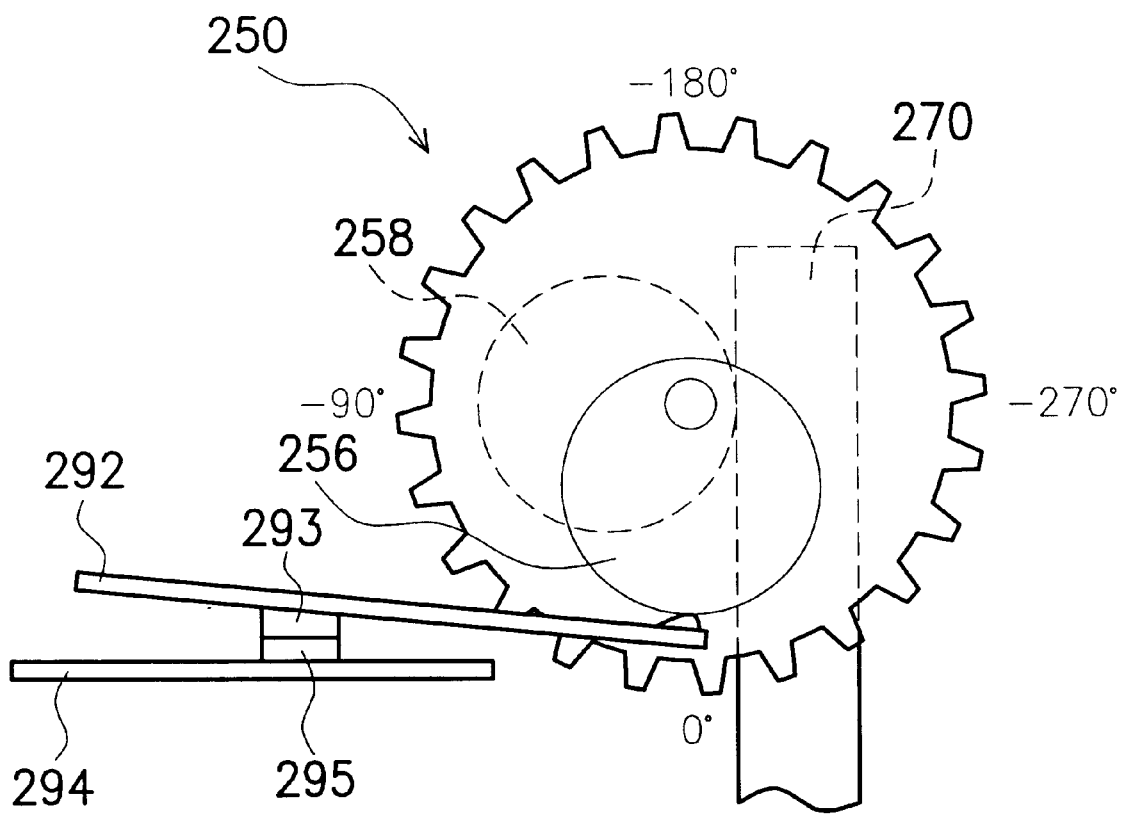
FIG. 8 is a top view showing the timing relationship between the transmission component, the limiting switch and the sliding plate before switching on the electric motor according to the invention.
Figure 9:
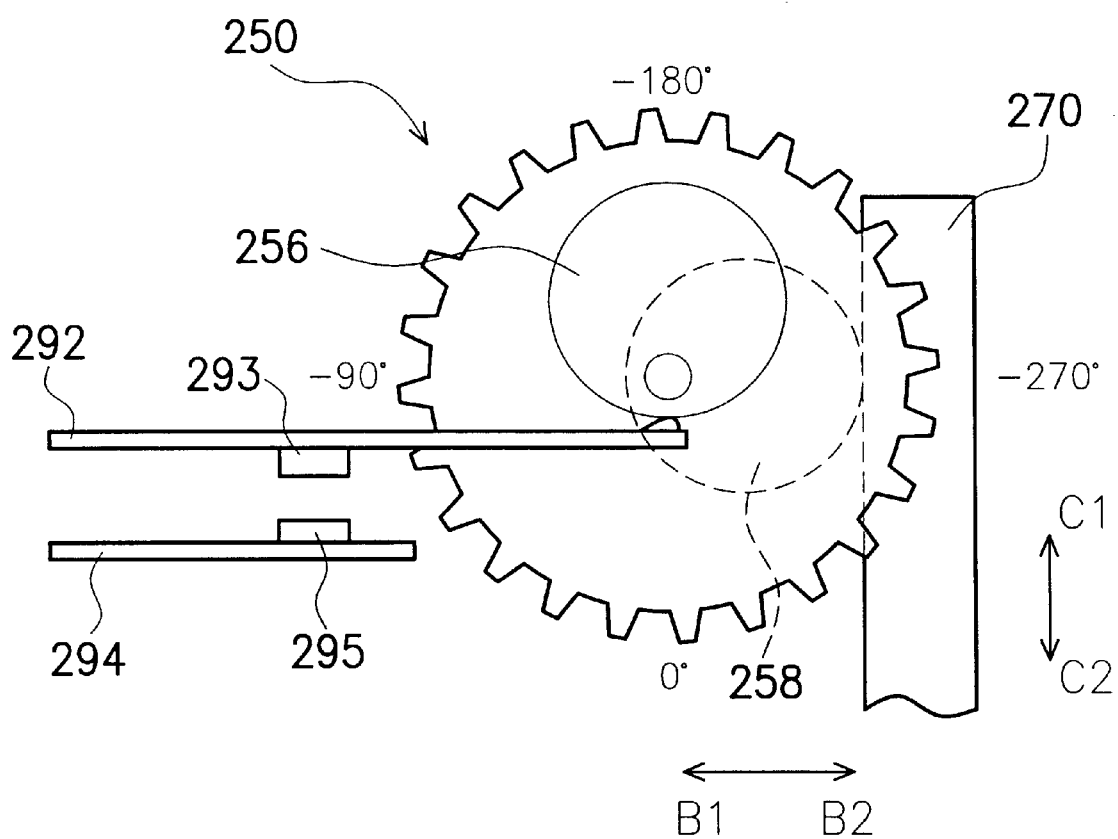
FIG. 9 is a top view of the invention, showing the timing relationship between the transmission component, the limiting switch and the sliding plate after the electric motor rotates the transmission component by a full 180°.

FIG. 8 is a top view showing the timing relationship between the transmission component, the limiting switch and the sliding plate before switching on the electric motor. FIG. 9 is a top view showing the timing relationship between the transmission component, the limiting switch and the sliding plate after the electric motor rotates the transmission component by a full 180°. In the initial state shown in FIG. 8, the first eccentric wheel 256 is positioned at a 0° angle so that the second eccentric wheel 258 is positioned at a −90° angle. At this stage, the first contact point 293 of the first electrode head 292 is in contact with the second contact point 295 of the second electrode head 294, thereby forming an electrical connection. On activating the electric motor 220 as shown in FIG. 9, the transmission component 250 rotates in a counter-clockwise direction. The first electrode head 292 moves in the direction C1 with constant contact with the first eccentric wheel 256 due to a spring loading in the first electrode head 292. Consequently, the first contact point 293 of the first electrode head 292 detaches from the second contact point 295 of the second electrode head 295. Since the second eccentric wheel 258 is capable of moving the sliding plate 270 in direction B2, the latching button edge 276 of the sliding plate 270 gradually moves away from the latch button 302 of the optical disk housing 300 when the second eccentric wheel 258 rotates. Hence, the latching button 302 no longer clicks onto the sliding plate 270 and the optical disk body 310 is able to eject from the optical disk housing 300 by the optical disk ejection system (shown in FIG. 2). As the transmission component 250 continues to rotate, the rotating first eccentric wheel 256 pushes the first electrode head 292 in the direction C2. Finally, the first contact point 293 of the first electrode head 292 contacts with the second contact point 295 of the second electrode head 294, thereby forming an electrical connection again. In the meantime, the limiting switch submits a signal to the electric motor 220 to stop the motor 220. Through the loading provided by the spring 280, the sliding plate 270 remains attached to side of the second eccentric wheel 258 (shown in FIG. 7) and moves in the direction B1. Here, the process of opening up the optical disk body is complete.

The process of closing back the optical disk body 310 can be explained with reference to FIG. 2. Since the sliding plate 270 has a slanted edge 278, the sliding plate 270 moves in the direction B2 when the latch button 302 touches the slanted edge 278. Subsequently, when the optical disk body 310 moves into the optical disk housing 300, the sliding plate 270 moves in the direction B1 and finally clicks onto the latching button 302.

Because the aforementioned optical disk mechanism is mounted on the backside of the optical disk body, overall volume of the optical disk is reduced. Hence, not only is material saved, but a lighter and slimmer optical disk is also produced. In addition, the optical disk control mechanism can first be assembled together before it is mounted onto the optical disk body. Such modular design simplifies the assembling of optical disk control mechanism.

Figure 10:
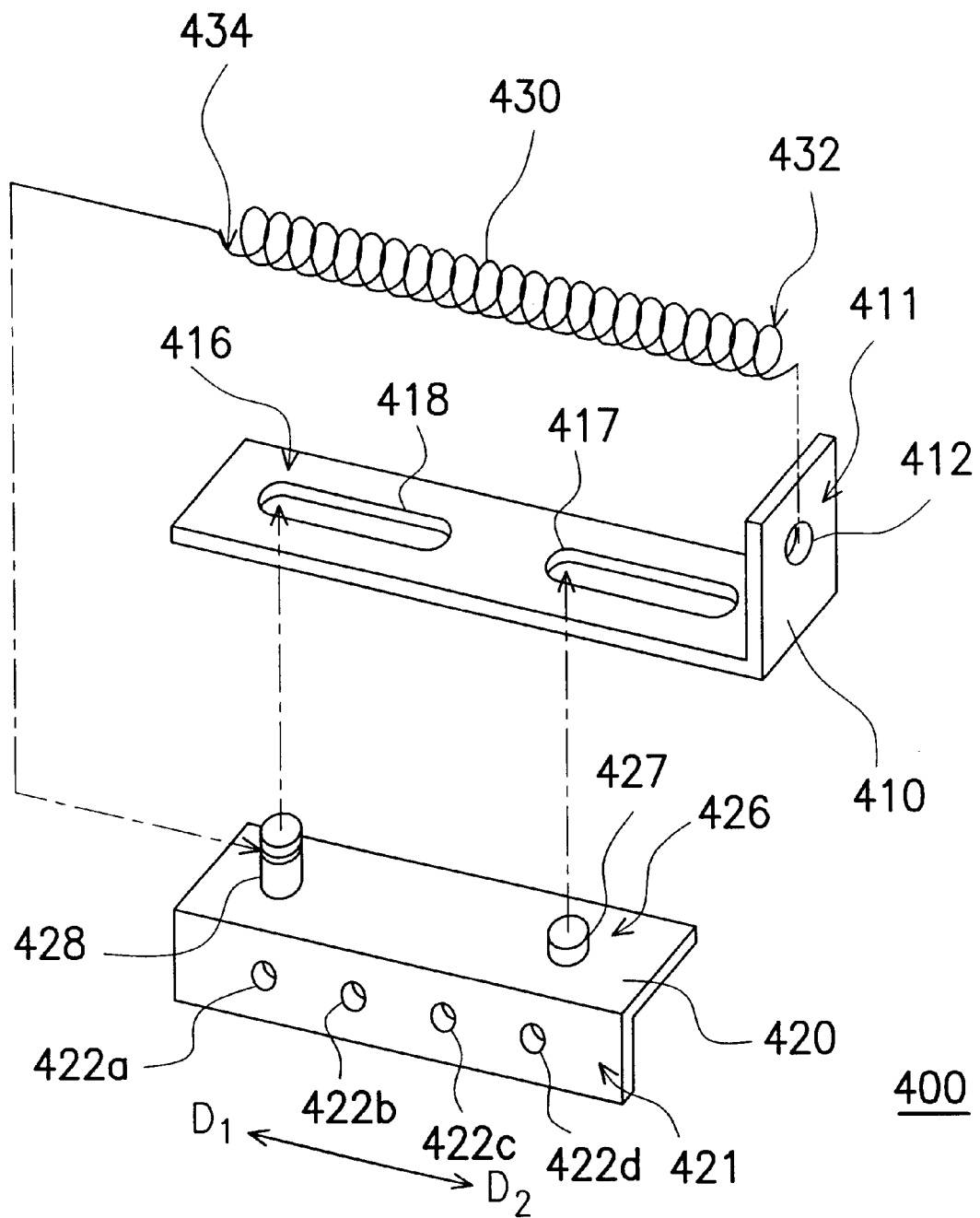
FIG. 10 is a sketch showing various components in the optical disk ejection system according to the invention.

FIG. 10 is a sketch showing various components in the optical disk ejection system. As shown in FIG. 10, the optical disk ejection system 400 includes an actuator 410, a stationer 420 and a spring 430. The actuator 410 can be divided into a vertical section 411 and a horizontal section 416. The actuator 410 has a hole 412, a first channel slot 417 and a second channel slot 418. The hole 412 is located in the middle of the vertical section 411. The first channel slot 417 and the second channel slot 418 are located in the horizontal section 416. The stationer 420 can be divided into a fixed section 421 and a carrier section 426. The stationer 420 has four holes 422*a*, 422*b*, 422*c* and 422*d* above the fixed section 421. The stationer 420 also has a guiding pin 427 and a fixing pin 428 above the carrier section 426. The fixing pin 428 is inserted into the second channel slot 418 and the guiding pin 427 is inserted into the first channel slot 417 so that the actuator 410 can slide in a D1 to D2 direction. The spring 430 has a first end 432 and a second end 434. The first end 432 of the spring 430 is fastened to the hole 412 in the actuator 410. The second end 434 of the spring 430 is fastened to the fixing pin 428 of the stationer 420.

As shown in FIG. 2, when all four screws (not shown) are screwed into the four holes 422*a*, 422*b*, 422*c* and 422*d*, the optical disk ejection system 400 is locked onto the optical disk body 310.

Figure 11:
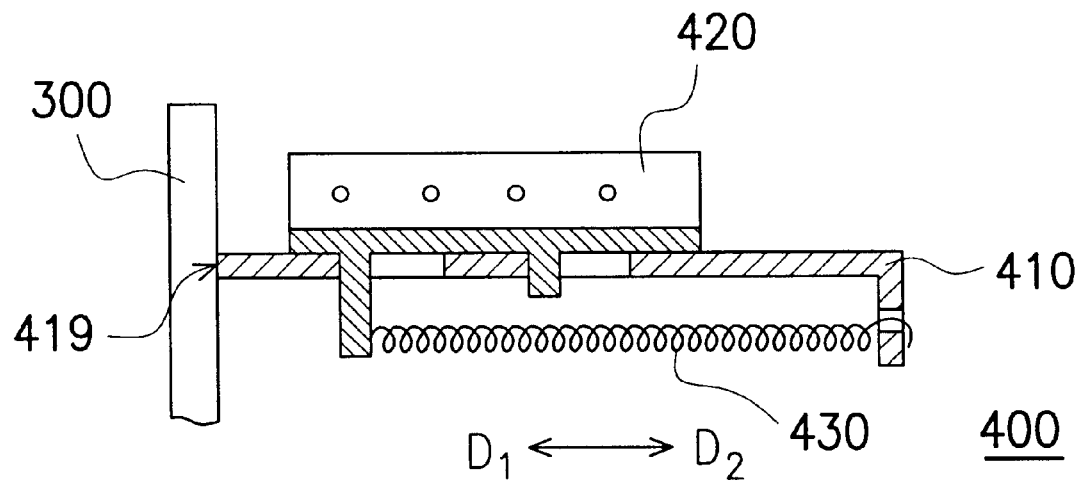
FIG. 11 is a cross-sectional view of the invention, showing the optical disk ejection system when the optical disk body is clicked inside the optical disk housing.

FIG. 11 is a cross-section view showing the optical disk ejection system when the optical disk body is clicked inside the optical disk housing. When the optical disk body is engaged inside the optical disk housing 300, one end 419 of the actuator 410 is propped against the optical disk housing 300. At this moment, the spring 430 in the optical disk ejection system 400 is pulled to the longest length so that the spring 430 has the highest elastic potential.

Figure 12:
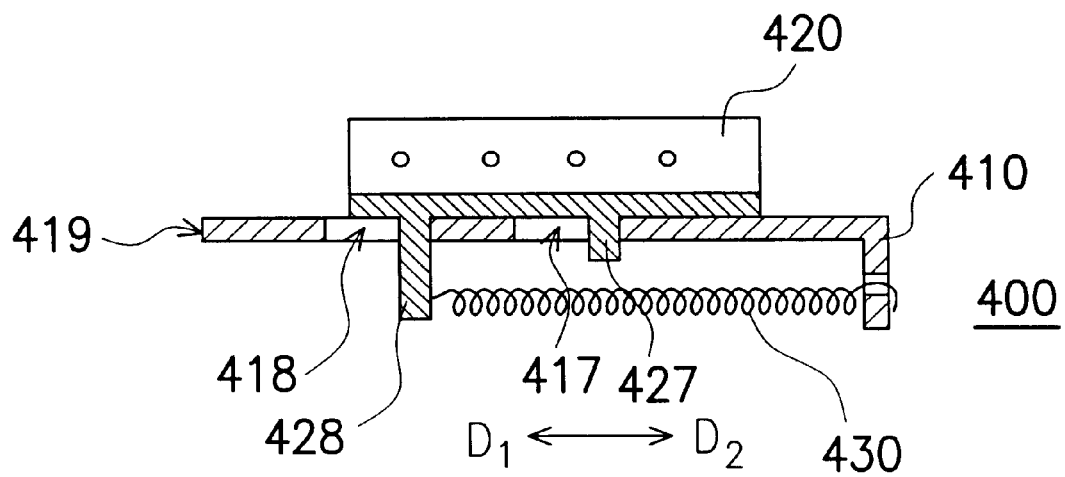
FIG. 12 is a cross-sectional view of the invention, showing the optical disk ejection system when the optical disk body is pushed away from the optical disk housing.

FIG. 12 is a cross-sectional view showing the optical disk ejection system when the optical disk body is pushed away from the optical disk housing. First, as shown in FIG. 11, the sliding plate moves when driven by the optical disk control mechanism so that the sliding plate no longer clicks to the latching button. At this moment, the spring 430 of the optical disk ejection system 400 releases the elastic potential so that the actuator 410 moves in direction D1 (relative to the stationer 420). With the optical dish housing 300 serving as a supporting point, the stationer 420 fastened optical disk body (not shown) moves in direction D2. Hence, the optical disk body is pushed out from the optical disk housing 300. The guiding pin 427 and fixed pin 428 of the stationer 420 are propped against the first channel slot 417 and the second channel slot 418 of the actuator 410 as shown in FIG. 12.

When the optical disk body retracts back into the optical disk housing as shown in FIG. 12, the upper end 419 of the actuator 410 is first contact point. On returning into the interior of the optical disk housing as shown in FIG. 11, the optical disk body moves the actuator 410 in direction D2 and extends the spring so that elastic energy is again stored.

In summary, the advantages of this invention at least include:

1. The optical disk control mechanism is mounted on the backside of the optical disk body so that overall volume of the optical disk is reduced. Hence, the optical disk uses less material and the resulting optical disk is lighter, slimmer and smaller.
2. Since the optical disk control mechanism occupies a smaller overall volume, the resulting optical disk can fit inside a slimmer package.
3. Because the optical disk control mechanism can be assembled together in a modular fashion before being mounting on the optical disk body, production of the optical disk control mechanism is very much simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disk control mechanism, comprising:
    a base frame,
    an electric motor fastened to the base frame, wherein the electric motor has a rotary transmission axle;
    a worm screw fixed to the transmission axle of the electric motor so that the worm screw rotates when driven by the transmission axle;
    a circular rod fixed to the base frame;
    a transmission component having a worm gear, a first eccentric wheel and a second eccentric wheel such that the first eccentric wheel and the second eccentric wheel are positioned to each side of the worm gear, wherein the transmission component has a hole corresponding to a center of the worm gear for sliding an entire transmission component into the circular pin through the hole so that the transmission component rotates using a center of the circular pin as a pivot, the worm screw meshing with the worm gear so that the transmission component rotates when driven by the worm screw, and after projecting shape centers of the first eccentric wheel, the second eccentric wheel and the worm gear onto a plane, a straight line from the shape center of the first eccentric wheel to the shape center of the worm gear and a straight line from the shape center of the second eccentric wheel to the shape center of the worm gear form a phase angle;
    a limiting switch fixed on the base frame, wherein the limiting switch has a first electrode head and a second electrode head, and the first eccentric wheel makes contact with the first electrode head so that the first electrode head makes contact with the second electrode head when the transmission component rotates;
    a sliding plate sliding on the base frame, wherein the sliding plate has an edge such that the second eccentric wheel makes contact with the edge and pushes the sliding plate along when the transmission component rotates; and
    a spring having one end fastened to the base frame while another end is fastened to the sliding plate.

2. The optical disk control mechanism of claim 1, wherein the worm gear, the first eccentric wheel and the second eccentric wheel of the transmission component are manufactured as an integrated unit.

3. The optical disk control mechanism of claim 1, wherein the phase angle is about 90°.

4. An optical disk control mechanism, comprising:
    a transmission component that includes a worm gear, a first eccentric wheel and a second eccentric wheel;
    a limiting switch including a first electrode head and a second electrode head, wherein the first eccentric wheel makes contact with the first electrode head so that the first electrode head and the second electrode head are electrically connected when the transmission component rotates; and
    a sliding plate having an edge, wherein the second eccentric wheel makes contact with the edge and pushes the sliding plate along when the transmission component rotates.

5. The optical disk control mechanism of claim 4, wherein the first eccentric wheel and the second eccentric wheel are positioned on each side of the worm gear.

6. The optical disk control mechanism of claim 4, wherein after projecting shape centers of the first eccentric wheel, the second eccentric wheel and the worm gear onto a plane, a straight line from the shape center of the first eccentric wheel to the shape center of the worm gear and a straight line from the shape center of the second eccentric wheel to the shape center of the worm gear form a phase angle.

7. The optical disk control mechanism of claim 6, wherein the phase angle is about 90°.

8. The optical disk control mechanism of claim 4, wherein the optical disk control mechanism further includes an electric motor having a transmission axle and a worm screw on the transmission axle such that the worm screw also meshes with the worm gear.

9. A control mechanism, comprising:
    a transmission component that includes a first timing element and a second timing element;
    a limiting switch that includes a first electrode head and a second electrode head, wherein the first timing element makes contact with the first electrode head so that the first electrode head and the second electrode head are electrically connected when the transmission component rotates; and
    a sliding plate having an edge, wherein the second timing element makes contact with the edge and pushes the sliding plate along when the transmission component rotates.

10. The control mechanism of claim 9, wherein the first timing element and the second timing element have a cylindrical shape.

11. The control mechanism of claim 9, wherein the transmission component further includes a transmission wheel such that the first timing element and the second timing element are positioned on each side of the transmission wheel.

12. The control mechanism of claim 11, wherein the transmission wheel includes a worm gear.

13. The control mechanism of claim 11, wherein after projecting a shape center of the first timing element, a shape center of the second timing element and a shape center of the transmission wheel, a straight line from the shape center of the first timing element to the shape center of the transmission wheel and a straight line from the shape center of the second timing element to the shape center of the transmission wheel form a phase angle.

14. The control mechanism of claim 13, wherein the phase angle is about 90°.

* * * * *